UNITED STATES PATENT OFFICE.

GEORGE SHEPHERD, OF PHILADELPHIA, PENNSYLVANIA.

IMPROVED LINIMENT FOR RHEUMATISM, &c.

Specification forming part of Letters Patent No. 42,115, dated March 29, 1864.

*To all whom it may concern:*

Be it known that I, GEORGE SHEPHERD, of Philadelphia, in the county of Philadelphia and State of Pennsylvania, have invented a new and useful Liniment for the Cure of Chronic and Inflammatory Rheumatism, &c.; and the following is a full and clear description of the same, viz:

To one gallon of alcohol I add one pint of jimson-seed (the seed of *Datura stramonium*) and one pint of pitch-knot dust. These ingredients are macerated for about twelve days and the liquid is then filtered. The liquid or extract is then ready for use. It is to be applied on the parts affected three times a day, from eight to ten minutes each time, and is to be rubbed in with the naked hand, with downward motion, to be applied in a warm room, the bottle to be well shaken before the liquid is applied.

Having thus described my invention, what I claim as new, and desire to secure by Letters Patent, is—

The composition or liniment made in the manner and of the materials substantially as herein set forth.

GEORGE SHEPHERD.

Witnesses:
JOHN D. BLOOR,
JOHN S. HOLLINGSHEAD.